G. GALE.
BALE-TIE.
No. 172,417. Patented Jan. 18, 1876.
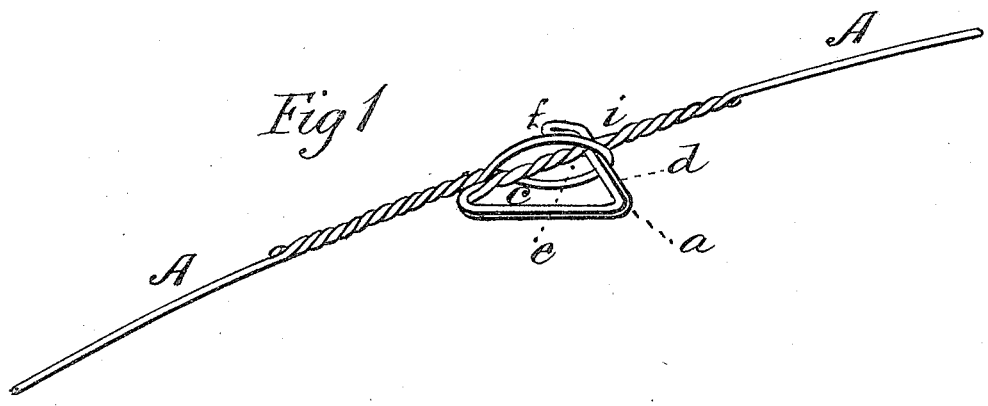
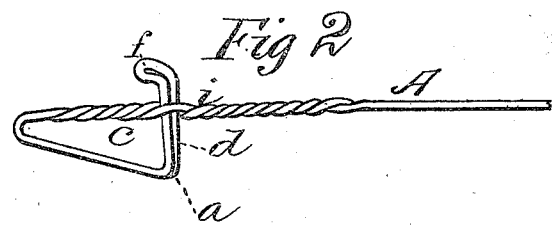
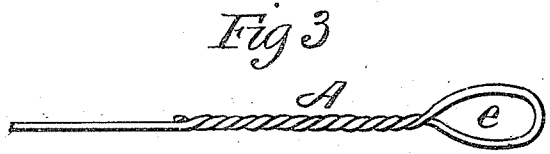
WITNESSES
Robert Everett
Bryan H. Morse
INVENTOR
Gilbert Gale
Chipman & Fosmer & Co,
ATTORNEYS.

UNITED STATES PATENT OFFICE.

GILBERT GALE, OF BARNERVILLE, NEW YORK.

IMPROVEMENT IN BALE-TIES.

Specification forming part of Letters Patent No. 172,417, dated January 18, 1876; application filed November 6, 1875.

*To all whom it may concern:*

Be it known that I, GILBERT GALE, of Barnerville, in the county of Schoharie and State of New York, have invented a new and valuable Improvement in Bale-Ties; and I do hereby declare that the following is a full, clear, and exact description of the construction and operation of the same, reference being had to the annexed drawings making a part of this specification, and to the letters and figures of reference marked thereon.

Figure 1 of the drawings is a perspective view of my bale-tie. Fig. 2 is a plan view. Fig. 3 is a side view.

This invention has relation to improvements in bale-ties which are especially designed for baling hay, straw, and other analogous substances; and it consists in a figure-of-four hook formed on a double and twisted end of a wire binder, in combination with a loop formed on the other end of the said wire, whereby a very effective and reliable tie is obtained, as will be hereinafter more fully explained.

In the annexed drawings, the letter A designates a metallic wire, on one end of which is a figure-of-four hook, $a$, formed out of a doubled portion thereof by first twisting the end of the said wire around its body and then bending it over and inward, as shown in Fig. 2. The free end of this hook is curved at $f$, and is designed to be passed between the threads composing the twisted portion of this end of the wire, thereby forming a loop, $c$, the rear bar $d$ of which will be at right angles to the length of the wire, as shown in Fig. 2. The other end of wire A is provided with a loop, $e$, formed by bending the remaining end of the said wire over and backward and twisting it around its body, as shown in Fig. 3.

My improved tie is used in the following manner, to wit: The mass to be baled having been reduced by pressure to the desired size, the wire is passed around the bale and its ends brought together. The angular barb $a$ is then thrust through loop $e$, the latter being then engaged over the rear bar $d$ of the former, thus completing the tie. By this means a perfectly reliable union of the two ends of the wire will be obtained, which will, however, be considerably strengthened by turning the free end $j$ of the figure-of-four barb outward toward its point, as shown in Fig. 1.

What I claim as new, and desire to secure by Letters Patent, is—

The bale-tie, as described, consisting of the barb $a$, in the form of figure 4, on one end of the hoop and a loop on the other, adapted for application substantially as specified.

In testimony that I claim the above I have hereunto subscribed my name in the presence of two witnesses.

GILBERT GALE.

Witnesses:
DE WITT C. DOW,
TIFFANY LAWYER.